(12) United States Patent
DiFilippo

(10) Patent No.: US 7,635,847 B2
(45) Date of Patent: Dec. 22, 2009

(54) NON-INVASIVE SCANNING DEVICE

(75) Inventor: Frank P. DiFilippo, Strongsville, OH (US)

(73) Assignee: The Cleveland Clinic Foundation, Cleveland, OH (US)

( * ) Notice: Subject to any disclaimer, the term of this patent is extended or adjusted under 35 U.S.C. 154(b) by 67 days.

(21) Appl. No.: 11/351,921

(22) Filed: Feb. 10, 2006

(65) Prior Publication Data

US 2006/0180766 A1     Aug. 17, 2006

Related U.S. Application Data

(60) Provisional application No. 60/652,260, filed on Feb. 11, 2005.

(51) Int. Cl.
*G01T 1/161* (2006.01)
(52) U.S. Cl. .................. 250/363.09; 378/207; 378/208
(58) Field of Classification Search ............. 250/363.09
See application file for complete search history.

(56) References Cited

U.S. PATENT DOCUMENTS

| 4,017,730 A | * | 4/1977 | Barrett ................... 250/363.06 |
| 4,389,569 A | * | 6/1983 | Hattori et al. .......... 250/363.04 |
| 4,584,478 A | * | 4/1986 | Genna et al. ........... 250/363.04 |
| 4,715,591 A | * | 12/1987 | Dragmen, Sr. ................. 5/601 |
| 5,851,182 A | * | 12/1998 | Sahadevan ................... 600/407 |
| 5,936,248 A | * | 8/1999 | Heukensfeldt Jansen ................... 250/363.07 |
| 6,228,664 B1 | | 5/2001 | Bronson et al. |
| 6,271,524 B1 | * | 8/2001 | Wainer et al. .......... 250/363.03 |
| 6,490,476 B1 | * | 12/2002 | Townsend et al. ........... 600/427 |
| 2004/0239941 A1 | | 12/2004 | Schramm et al. |
| 2005/0072929 A1 | * | 4/2005 | Chuang et al. ......... 250/363.03 |
| 2005/0215873 A1 | * | 9/2005 | Peter ......................... 600/407 |

OTHER PUBLICATIONS

Beque et al., "Characterization of Pinhole SPECT Acquisition Geometry," *IEEE Transactions on Medical Imaging*, vol. 22, No. 5, pp. 599-612, May 2003.
Jaszczak et al., "Pinhole Collimation for Ultra-High-Resolution, Small-Field-of-View SPECT," *Phys. Med. Biol.* 39 (1994) 425-437.
Schramm et al., "High-Resolution SPECT Using Multipinhole Collimation," *IEEE Transactions on Nuclear Science*, vol. 50, No. 3, pp. 315-320, Jun. 2003.

* cited by examiner

*Primary Examiner*—David P Porta
*Assistant Examiner*—Jessica L Eley
(74) *Attorney, Agent, or Firm*—Tarolli, Sundheim, Covell & Tummino LLP

(57) ABSTRACT

Methods and systems are provided for radioactive imaging of a test subject. At least one detector is operative to detect a radiation type associated with the subject. A test bed supports the test subject. A collimator assembly is positioned between the test bed and the at least one detector. The collimator assembly is not mechanically coupled to the at least one detector.

21 Claims, 3 Drawing Sheets

NON-INVASIVE SCANNING DEVICE

RELATED APPLICATION

This application claims priority from U.S. provisional patent application Ser. No. 60/652,260, filed on Feb. 11, 2005, the subject matter of which is incorporated herein by reference.

FIELD OF THE INVENTION

The present invention relates to a system and method for non-invasive imaging and, in particular, is directed to a system and apparatus for non-invasive imaging of laboratory subjects.

BACKGROUND OF THE INVENTION

Modern imaging techniques, such as single photon emission computed tomography (SPECT) allow the imaging of the interior of a target object without physically penetrating the surface of the target. These techniques are used extensively in the medical field. By allowing indirect observation of the interior of the human body, these imaging techniques give medical professionals increased diagnostic information without the accompanying risk of conventional exploratory techniques.

The scanners used for performing noninvasive imaging tend to be both large and expensive. A typical facility will be able to devote the space and financial resources to install only a limited number of scanning devices. The scanners also tend to be in high demand. For example, at many facilities, the available scanners will be used for both clinical use and research. Accordingly, systems and methods for maximizing the efficient usage of the available scanners are desirable.

The need for non-invasive imaging extends also to the realm of pre-clinical research, where small animals such as mice are often used as experimental models. Such research studies often involve studying the progression of disease and the success or failure of experimental therapies. It is hoped that the animal model closely mimics the human model and that the animal research would accelerate the development of pharmaceuticals and therapies for humans. Just as non-invasive imaging in humans has become valuable for medical care, non-invasive imaging in animals is becoming valuable for pre-clinical research. The ability to image the animal without surgery or dissection means that an animal can be repeatedly imaged to study the progress of disease and therapy.

In order to meaningfully image small animals, the scanner requirements are such that the spatial resolution must be substantially more precise than that for human scanners. Although expensive high-resolution scanners dedicated for imaging small animals is an option, it is desirable that scanners primarily designed for another application or for human use may also be used for this purpose.

SUMMARY OF THE INVENTION

In accordance with one aspect of the present invention, a system is provided for radioactive imaging of a test subject. At least one detector is operative to detect a radiation type associated with the subject. A test bed supports the test subject. A collimator assembly is positioned between the test bed and the at least one detector. The collimator assembly is not directly mechanically coupled to the at least one detector.

In accordance with another aspect of the present invention, an assembly is provided for imaging a small laboratory subject in conjunction with a scanner designed primarily for another application. The assembly includes a test bed that supports the subject and a collimator assembly positioned between the test bed and the at least one detector. The collimator assembly is not mechanically coupled to the at least one detector.

In accordance with yet another aspect of the present invention, a method is provided for radioactive imaging of a test subject. The test subject and at least one calibration marker are inserted into a scanner. The scanner includes at least one detector operative to detect a radiation type associated with the subject and the calibration marker. The test subject and the at least one calibration marker are scanned to produce a set of scan data representing the subject and at least one calibration marker. A plurality of scanner calibration parameters are determined from the information within the scan data relating to the at least one calibration marker. At least one image of the test subject is reconstructed from the set of scan data according to the determined plurality of calibration parameters.

BRIEF DESCRIPTION OF THE DRAWINGS

The foregoing and other features of the present invention will become apparent to those skilled in the art to which the present invention relates upon reading the following description with reference to the accompanying drawings, in which.

DESCRIPTION OF EMBODIMENTS

Figure 1:
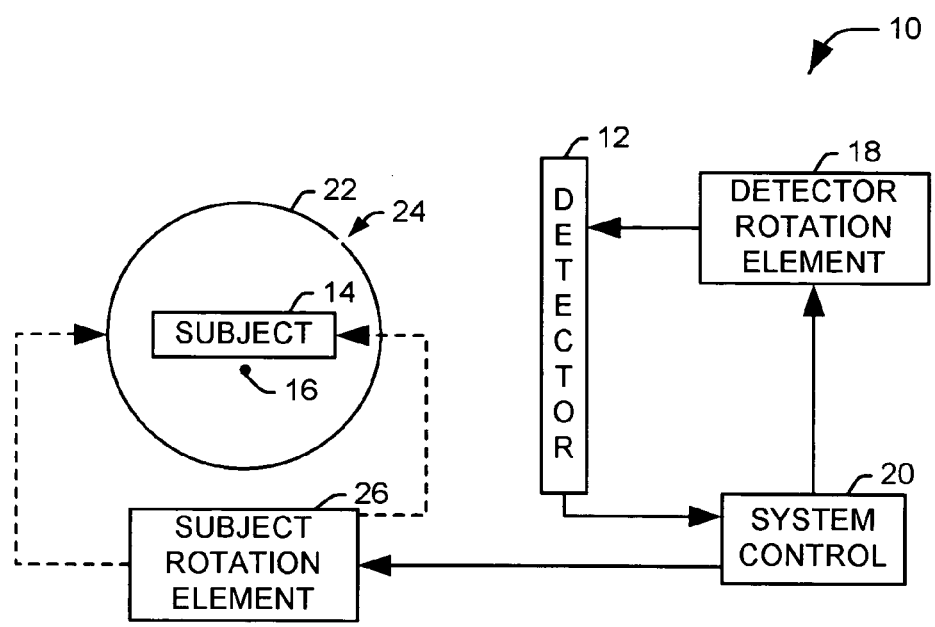
FIG. 1 illustrates a functional block diagram of scanning assembly in accordance with an aspect of the present invention.

FIG. 1 illustrates a functional block diagram of scanning assembly 10 in accordance with an aspect of the present invention. The scanning assembly includes at least one detector 12 that is operative to detected radiation emitted from a test subject 14. For example, the at least one detector 12 can include any appropriate detector for detecting radiation from a subject, such as nuclear detectors that detect radiation emitted from the subject, radiological imaging devices (e.g., for computed tomography) that irradiate the subject 14 and detect attenuation of the radiation as it passes through the subject, or a combination of multiple detector types.

The test subject 14 can have at least one associated calibration marker 16, for example, mounted to a test bed (not shown) associated with the test subject. A given calibration marker is selected to have associated dimensions and radiological properties as to produce a relatively small, easily recognizable point at the detector. For example, where the detector is a nuclear detector, a point source of radiation can be utilized a calibration marker. A point source 16 is a radiation source that is significantly smaller in volume and more active than the test subject 14 such that it appears as a small, bright point at the detector 12. Any of number of radioactive substances can be utilized to provide the point source, and the type and activity of the source can vary with the type or types of detectors comprising the at least one detector 12. In one implementation, the at least one point source comprises an active element of $^{153}$Gd embedded in a sealed source assembly. Alternatively, if a radiological imaging device is used as one of the at least one detector 12, the at least one calibration marker can comprise at least one radio-opaque marker. Similar to the radiation point source, the radio-opaque marker can be significantly smaller in volume than the subject and attenuate radiation to a greater extent such that it appears as a small, dark point at the detector 12.

In many cases, it may be optimal to improve tomographic sampling by imaging the subject with multiple angular views. A detector rotation element 18 is operative to rotate the at least one detector 12 through a plurality of incrementally different scan angles. It will be appreciated that in some implementations of the present invention, the at least one detector 12 will be stationary, and the detector rotation element 18 will not be present. For example, the detector rotation element 18 can comprise a gantry arrangement that moves the at least one detector 12 into an appropriate position for each of the plurality of scan angles. The action of the detector rotation element 18 can be controlled by a system control 20 that directs the detector rotation element 18 according to a predetermined sequence of angles. For example, the system control 20 can comprise a general purpose computer provided with appropriate software. The system control 20 can, for example, provide a list of scanning angles to the detector rotation element 18 and receive the data produced at each angle. Alternatively, the system control 20 can trigger each scan individually and receive the data for each individual scan in response.

A collimator assembly 22 can be mounted on or around a test bed containing the subject 14, such that the collimator assembly is interposed between the test subject from the at least one detector. The collimator assembly contains at least one collimator 24 that is operative to collimate the radiation from the test bed region, containing the subject 14 and the at least one calibration marker 16. For example, the collimator assembly 22 can include a lead shield with one or more pinholes to allow radiation to escape the test area with a desired emission pattern. Given the magnifying effects the collimator 24, the native resolution of the at least one detector 12 can be increased significantly through use of the collimator.

In accordance with an aspect of the present invention, the collimator assembly 22 is not in physical or mechanical communication with the at least one detector 12. Accordingly, the collimator assembly 22 will not necessarily rotate with the at least one detector during scanning. A subject rotation element 26 is provided for rotating the test subject 14 and the at least one calibration marker 16 relative to the collimator assembly 22. In accordance with an aspect of the present invention, the second rotation element 26 can be operative to rotate either or both of the test bed and the collimator assembly 22 during scanning. The system control 20 can be operative to control the rotation element 26 as to maintain an appropriate relationship between the at least one detector 12 and the rotation of the test bed or collimator assembly.

In one implementation of the present invention, the system control 20 can be operative to automatically calibrate the scanning assembly 12 based upon information from the at least one detector relating to the at least one calibration marker 16. For example, a plurality of parameters defining the relative position and orientation of the at least one calibration marker 16, the at least one detector 12, and the at least one collimator 24 can be determined via a least-squares analysis of the parameters against the position of the at least one calibration marker within the scan data. Since the at least one calibration marker 16 takes up little space on a given scan image, both the test subject 14 and the at least one calibration marker 16 can be inserted into the assembly simultaneously, as opposed to calibrating the system separately with a test phantom. The calibration can be performed in a first of a sequence of two scans of the test subject 14 and the at least one calibration marker 16, or, in accordance with an aspect of the present invention, the scan can be performed once on the test subject 14 and the at least one calibration marker 16 and the necessary data for calibration can be extracted from the scan data.

Figure 2:
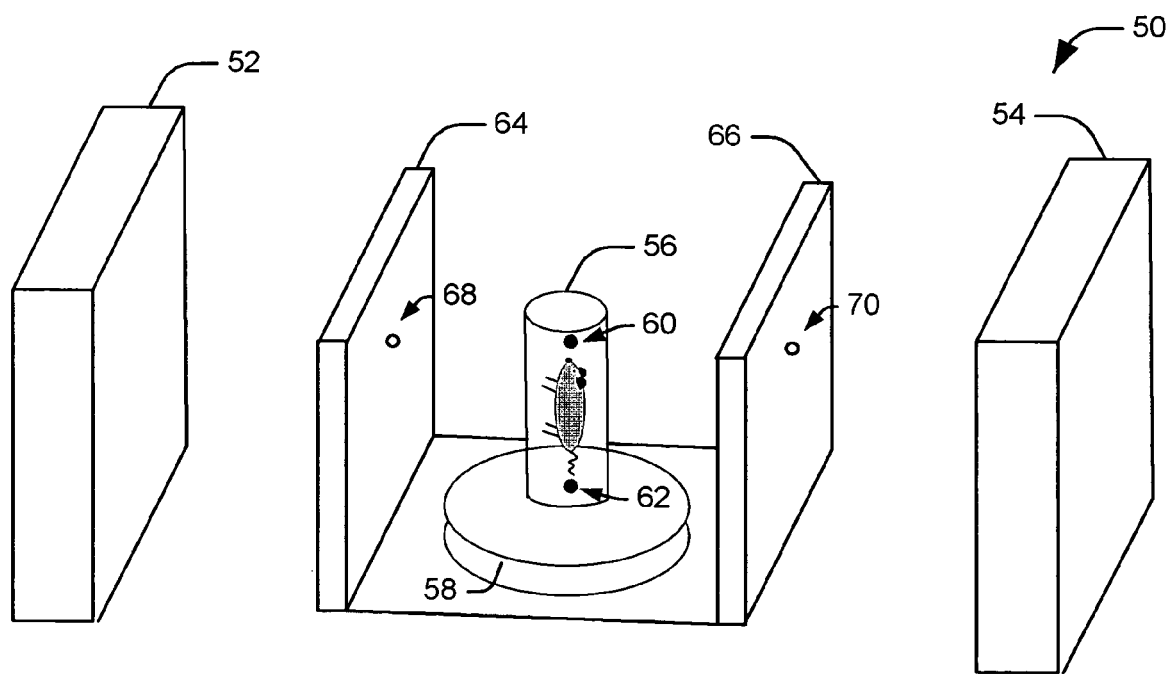
FIG. 2 illustrates an exemplary scanning system for imaging laboratory test subjects in a clinical scanner.

FIG. 2 illustrates an exemplary scanning system 50 for imaging small laboratory test subjects with detectors primarily designed for other imaging applications. In the illustrated implementation, the clinical scanner comprises two detectors 52 and 54 that are operative to detect one or more types of radiation. In one implementation, the scanner can be a clinical single photon emission computed tomography (ASPECT) system and the detectors 52 and 54 can comprise gamma cameras. Alternatively, the detectors can comprise a system primarily designed for positron emission tomography (PET) or computed tomography (CT). It will be appreciated, however, that a variety of scanner types can be utilized in accordance with an aspect of the present invention.

In the illustrated implementation, the subject is placed vertically with a test bed 56 mounted on a rotating stage 58. At least one radiation point source 60 and 62 can be mounted on the test bed 56 above and below the subject. A given radiation point source (e.g., 60 and 62) can comprise, for example, liquid $^{99m}$Tc in one or more capillary tubes or a sealed, long-lived $^{153}$Gd source. It will be appreciated, however, one or more radio-opaque markers could be used in combination with or in place of the at least one radiation point sources 60 and 62 to accommodate other detector types (e.g., detectors primarily designed for PET or CT).

A pair of collimator assemblies 64 and 66 can be placed on either side of the test bed 56 such that each collimator assembly 64 and 66 is between one of the detectors 52 and 54 and the test bed 56. A given collimator assembly (e.g., 64) can be made of any suitable material for blocking the radiation associated with the test subject and the point sources 60 and 62. For example, the collimator assemblies 64 and 66 can be comprised of lead. Each collimator assembly 64 and 66 includes an associated collimator 68 and 70, for example, a pinhole collimator, that allows radiation through the collimator assembly. It will be appreciated that the configuration of the collimator assembly can be adjusted to improve the quality (e.g., resolution, scope, or magnification) of the imaging of the subject. For example, the position of the collimator assembly, relative to at least one of the subject and the at least one detector, can be adjusted or the configuration of the pinholes in the collimator assembly can be changed as to alter the scope and magnification associated with the image.

In accordance with an aspect of the present invention, the rotating stage 58 can be incremented through a plurality of desired scan angles to provide complete tomographic imaging of the test subject. For example, the rotating stage 58 and the detectors can be controlled by a system control (not shown) to rotate the stage to a desired angle and take a reading at the detectors in a "step and shoot" arrangement. At each scan angle, radiation from the test subject is effectively magnified at each collimator 68 and 70 and provided to the detectors 52 and 54.

In accordance with an aspect of the present invention, scan data from the detectors 52 and 54 relating to the at least one point source 60 and 62 can be utilized to generate a plurality of calibration parameters for the system. Once the calibration parameters have been generated, the point sources 60 and 62 can be edited from the scan data, and the edited scan data can be reconstructed into an image of the test subject. In one implementation of the present invention, the editing may be achieved by acquiring the data in two separate windows of the photon energy spectrum, with one energy window tuned for the scan data, and the other energy window tuned for the data relating to the point sources 60 and 62. For example, the subject can be injected with a first radioisotope that emits radiation (e.g., gamma radiation) having a first characteristic energy, and the point sources can comprise a second radioisotope that emits radiation having a second characteristic energy.

Figure 3:
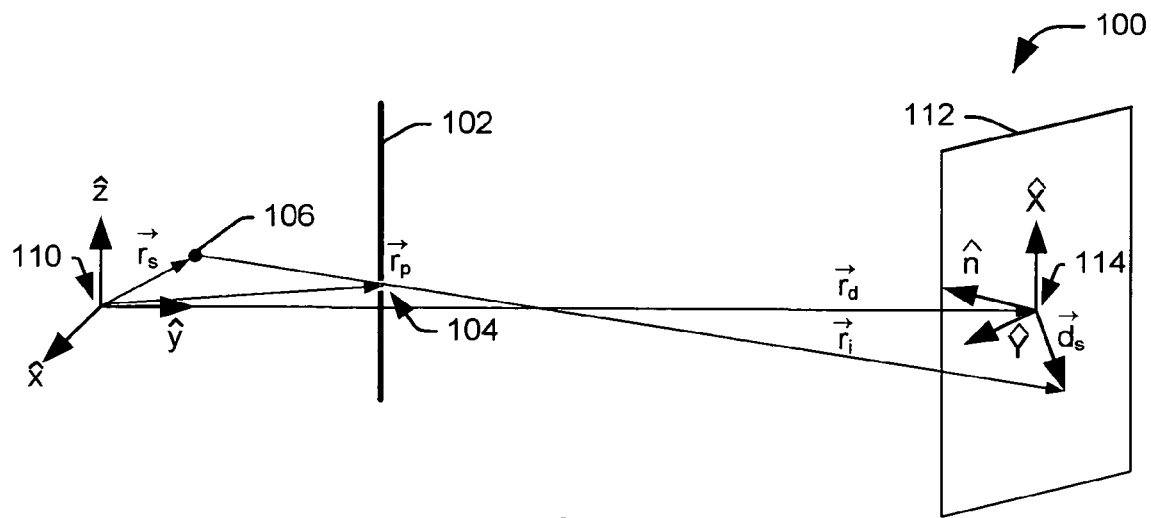
FIG. 3 illustrates a schematic diagram of a scanning assembly in accordance with an aspect of the present invention.

FIG. 3 illustrates a schematic diagram of a scanning assembly 100 in accordance with an aspect of the present invention. The schematic diagram 100 illustrates a selected set of the parameters quantified during the calibration process and provides a basis for an explanation of the automatic calibration function of a scanner implemented in accordance with an aspect of the present invention. Specifically, the described scanner is similar to that illustrated in FIG. 2, with at least one stationary detector and collimator assembly and a rotating test bed. The scanning assembly 100 includes a collimator assembly 102 with at least one pinhole aperture 104 that allows radiation from a radiation source 106 to pass through the collimator assembly. For example, the radiation source can comprise a radiation point source, that is, a radiation source having a volume that is significantly smaller than that of an associated test subject and more active than a test subject such that it appears as a small, bright point at a detector. It will be appreciated, however, that in other implementations of the present invention, the calibration function can utilize one or more radio-opaque markers in combination with or in place of the radiation source.

An imaging volume can be defined in the region surrounding the radiation source 106. The imaging volume can be defined by an associated set of coordinate axes 110, $\hat{x}$, $\hat{y}$, and $\hat{z}$. Within the coordinate system associated with the imaging volume, referred to hereinafter as "imaging coordinates", a position vector, $\vec{r}_s$, can be defined to represent the position of the radiation source 106. Similarly, a position vector, $\vec{r}_p$, can define the position of the pinhole collimator 104 in imaging coordinates. (It will be appreciated that $\vec{r}_s$ and $\vec{r}_p$ can be measured from a prior calibration of the configuration of the scanning assembly, or can be measured simultaneously through the calibration of the entire system geometry.)

The scanning assembly 100 can further include a planar detector 112 that detects the radiation emitted by the radiation source 106. The detector 112 can have an associated planar coordinate system defined by a plurality of coordinate axes 114, $\hat{X}$, $\hat{Y}$, and $\hat{n}$, hereinafter referred to as "detector coordinates", for identifying the location of detected event at the detector. Coordinate axes $\hat{X}$ and $\hat{Y}$ define points within the plane of the detector, while $\hat{n}$ is an axis normal to the plane of the detector. A center point of the detector can be defined in the imaging coordinates as a position vector, $\vec{r}_d$.

The radiation from the radiation source 106 can be detected by the detector 112 at a position defined in the detector coordinates by a position vector $\vec{d}_s$. Of interest in calibrating the detector is the relationship between the position of the detected radiation at the detector and the position of the detected event in imaging coordinates. To this end, we can describe the point at which the collimated radiation from the radiation source 106 intersects the plane of the detector in imaging coordinates as a function of $\vec{r}_s$, $\vec{r}_p$, and $\vec{r}_d$. The geometric relationship between these vectors and the detected coordinates are often termed the "forward projector" equation:

$$\vec{d}_s = f(\vec{r}_s, \vec{r}_p, \vec{r}_d)$$ Eq 1 in which the function f( ) expresses the imaging geometry.

It will be appreciated that the collimator location, $\vec{r}_p$, and the detector center point, $\vec{r}_d$, are not assumed. In practice, however, the device would be positioned so that $\vec{r}_p$ and $\vec{r}_d$ will have values that are approximately equal to a desired constant along the $\hat{y}$ axis and approximately zero along the $\hat{x}$ and $\hat{z}$ axes. These values are selected as to optimize the magnification provided by the collimator. The offsets from these assumptions are expressed in the forward projector equation (Eq 1). Accordingly, to a first approximation, the normal axis of the detector, $\hat{n}$, is equal and opposite to the $\hat{y}$ axis of the imaging volume. It will be appreciated, however, that there will be a degree of tilt error in the alignment of the detector with the collimator. Parameters describing the tilt errors are also included in the forward projector equation (Eq. 1).

To increase the accuracy of the calibration, we can incorporate parameters accounting for rotation and wobble of the test bed 56 into the calculation. To simplify the calculations, we take the imaging volume and the radiation source 106 as our reference frame and treat the collimator assembly 102 and the detector 106 as rotating around the imaging volume. The rotation will be substantially around the $\hat{z}$ axis of the imaging volume, but it will be appreciated that the rotation can be slightly off-center.

To summarize the above, the mapping of a location in the imaging coordinate system to the coordinates of a detected event location in the detector coordinate system requires a set of parameters that describe the entire geometry of the system. These parameters are computed during a calibration process where point sources are imaged. These parameters may include three coordinates for the center point of the detector, $\vec{r}_d$, when the acquisition angle, $\theta$, is zero, three coordinates, $\vec{r}_p$, defining the position of the pinhole collimator 104 relative to the imaging volume, the detector tilt and rotation angles, the location of the axis of rotation, and the angles that define the tilt of the axis of rotation. Since the device is not in direct mechanical coupling to the detector, most or all of these parameters may not be known accurately in advance. Thus the accuracy of the calibration can be improved if all parameters are modeled in the forward projector. The ability to accurately calibrate the device facilitates the use of the scanner for the secondary application of imaging small laboratory subjects in this way, even though the scanner is primarily designed for another application.

When an additional detector (not shown) and collimator (not shown) are added, nine additional parameters can be added to the unknown parameters. For example, the additional parameters can include a set of three coordinates defining the location of the second detector, a set of three angles describing detector tilt and rotation of the second detector, and a set of three coordinates that describe the position of the second collimator. The position of the radiation source 106 and an optional second radiation source are used to define the origin and scaling volume of the imaging volume. If additional radiation sources are provided, further sets of coordinates describing the position of the radiation sources can be added to unknowns computed during the calibration process.

During the scan, the detected positions (X and Y coordinates) of the one or more radiation sources (e.g., 106) at each of the one or more detectors (e.g., 112) can be utilized as the known variables in a least-squares algorithm. A detected position for each radiation source at each detector can be determined at each of a plurality of acquisition angles, θ, associated with the one or more detectors. Accordingly, a number of data points equal to twice the product of the number of point sources and the number of acquisition angles are available for the least-squares analysis. The problem is thus well-defined, and appropriate calibration parameters can be acquired from the scan data.

Figure 4:
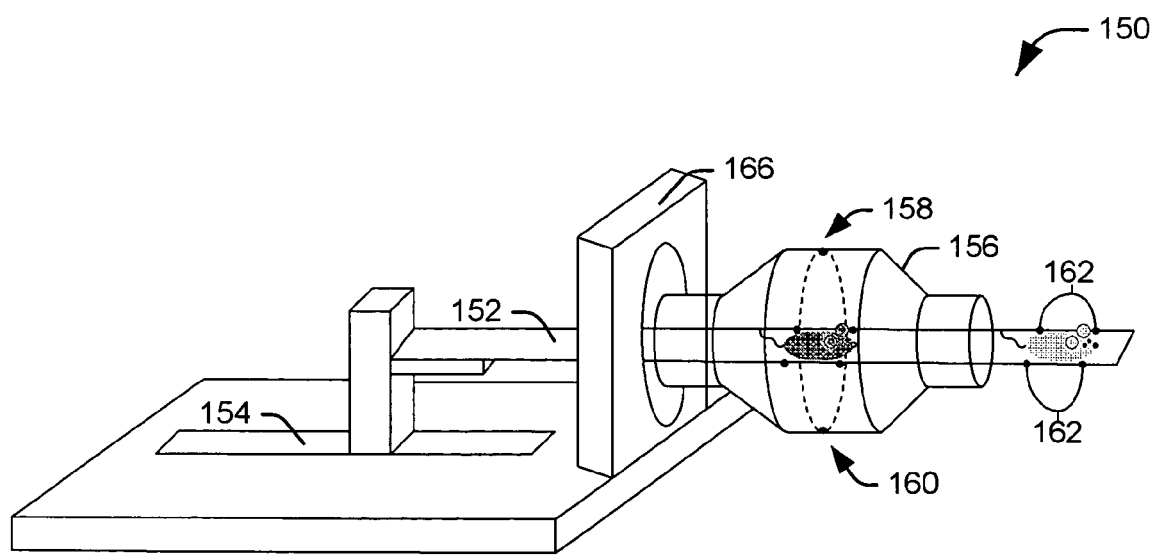
FIG. 4 illustrates an exemplary implementation of a microscanner system for use with a clinical scanner in accordance with an aspect of the present invention.

FIG. 4 illustrates an exemplary implementation of a microscanner system 150 for imaging a small laboratory subject with a scanner primarily designed for human patients in accordance with an aspect of the present invention. The microscanner includes a test bed 152 that can be shifted along a linear translation stage 154 as to bring a subject into a rotating collimator assembly 156 that substantially encircles the test bed or to remove the subject from the collimator assembly. The linear translation stage 154 can be used to easily insert and remove the subject and one or more calibration markers (e.g., radiation point sources, radio-opaque markers) from the collimator assembly 156. It will be appreciated that the collimator assembly 156 substantially shields the subject from radiation such that radiation can only pass through one or more pinhole apertures in the collimator assembly. Accordingly, the ability to easily remove the test bed, subject, and calibration markers from the collimator assembly allows the microscanner to be used for computed tomography imaging and other forms of imaging where use of the collimator assembly 156 is not desirable.

The collimator assembly 156 includes one or more pinholes (e.g., 158 and 160) that allow radiation from the test subject and at least one radiation point source 162 to pass through the collimator assembly 156 to one or more detectors associated with the clinical scanner. It will be appreciated, however, one or more radio-opaque markers could be used in combination with or in place of the at least one radiation point source 162 to accommodate other detector types (e.g., detectors primarily designed for PET or CT). In the illustrated example, four point sources 162 are arranged in pairs one hundred and eighty degrees apart on the test bed 152. It will be appreciated that more pinholes can be utilized to gain more radiation data and to improve image quality for a given scan at the cost of increasing the complexity of the calibration process.

In accordance with an aspect of the present invention, the collimator assembly 156 can be incremented through a plurality of desired scan angles by a rotary stage 166 to provide complete tomographic imaging of the test subject. It will be appreciated that the collimator assembly 156 can rotate independently from the detectors associated with the clinical scanner, such that it is necessary to synchronize the rotation between the detectors and the collimator assembly 156. To this end, the collimator assembly 156 and the clinical scanner can be controlled by a system control (not shown) to rotate the detectors to a desired angle, place the collimators at an appropriate orientation, and take a reading at the detectors in a "step and shoot" arrangement. Alternatively, the collimator assembly 156 can be controlled independently from the scanner, with the system control synchronizing the rotation of the collimator to the scanner according to known properties of the scanner. For example, the synchronization may be achieved sufficiently well by simultaneous manual initiation of the two control systems.

At each scan angle, radiation from the test subject and the point sources 162 is effectively magnified at each collimator and provided to the detectors comprising the scanner. In accordance with an aspect of the present invention, scan data from the detectors relating to the point sources 162 can be utilized to generate a plurality of calibration parameters for the system. In the illustrated example, using a human ASPECT scanner with two detectors, there are twenty-nine independent parameters that are determined by the system. Twenty of these parameters describe the geometry of the collimators (e.g., 158 and 160) and the detectors associated with the scanner and nine of these parameters describe the relative positions of the four point sources.

Defining the z-axis of the imaging volume as passing through true axis of rotation for the collimator assembly 156, and the x-y plane as passing through a first collimator 158, the twenty-nine parameters can include radii of rotation for the two detectors, shifts in the x and y directions for the two detectors, respective sets of three angles describing the rotation of the two detectors, two offset values and two rotational offset values describing wobble of the axis of rotation, radii of rotation for the two collimators, a shift and angular offset value for the second collimator, z-coordinates for the four point sources 162, x and y offset values for the cylinder containing the point sources, two rotational offset values for the cylinder containing the point sources, and a relative axial angle for the cylinder in relation to the axis of rotation. Values for the plurality of calibration parameters can be determined according to a least-squares analysis based on the detected locations of the four point sources at the detector. Once the calibration parameters have been generated, the point sources 162 can be edited from the acquired data, which is best done by acquiring the data in two separate energy windows (tuned for the point sources and for the scan data). The edited scan data can be reconstructed into an image of the test subject.

Figure 5:
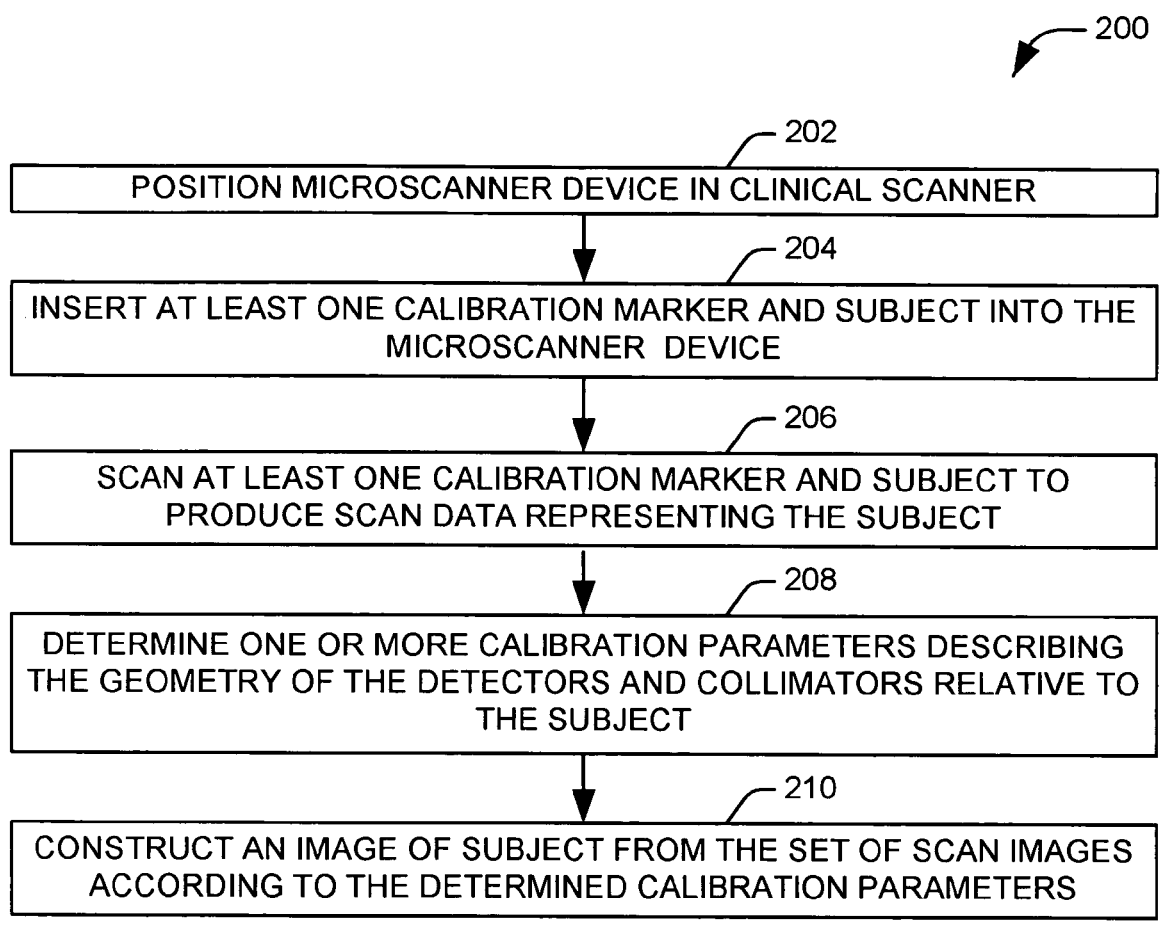
FIG. 5 illustrates a methodology for scanning a test subject in accordance with an aspect of the present invention.

FIG. 5 illustrates a methodology 200 for scanning a test subject in accordance with an aspect of the present invention. At step 202, a microscanner is positioned on the patient bed of a scanner designed primarily for human imaging. At step 204, at least one calibration marker and a test subject are placed within the microscanner. The at least one calibration marker can be mounted on the or near a test bed that supports the test subject such that the at least one calibration marker will not interfere with the imaging of the subject.

At step 206, the at least one calibration marker and the test subject are scanned to produce scan data representing the subject and the at least one calibration marker. For example, one or more of a detector assembly, a collimator assembly, or the test bed can be rotated to produce data from a plurality of scan angles. At step 208, a plurality of calibration parameters are calculated, describing the geometry of at least one detector and at least one collimator relative to the subject and calibration markers. For example, scan data related to the calibration markers can be utilized as part of a least-squares analysis to generate the plurality of parameters. At 210, the generated plurality of calibration parameters is used to reconstruct an image of the subject from the scan data.

From the above description of the invention, those skilled in the art will perceive improvements, changes, and modifications. Such improvements, changes, and modifications within the skill of the art are intended to be covered by the appended claims.

Having described the invention, I claim:

1. A system for non-invasive imaging of a test subject comprising:
    at least one detector operative to detect a radiation type associated with the subject, the at least one detector being designed primarily for imaging human patients;
    a test bed that supports the test subject;
    a collimator assembly, positioned between the test bed and the at least one detector, that is not mechanically coupled to the at least one detector, the collimator assembly being mechanically coupled to the test bed;
    wherein the test bed and the collimator assembly are proportioned to rest on a patient bed associated with the at least one detector.

2. The system of claim 1, comprising a rotation assembly that rotates the subject independently of a rotation associated with the at least one detector.

3. The system of claim 1, comprising a rotation assembly that rotates the collimator assembly independently of a rotation associated with the at least one detector.

4. The system of claim 1, wherein the at least one detector comprises a radiological scanner operative to direct radiation at the test subject and detect the attenuation in the radiation after it has passed through the subject.

5. The system of claim 1, wherein the at least one detector comprises a nuclear detector that detects radiation emitted from the test subject.

6. The system of claim 1, wherein the at least one detector comprises a first detector that includes a radiological scanner operative to direct radiation at the test subject and detect the attenuation in the radiation after it has passed through the subject and a second detector that includes a nuclear detector that detects radiation emitted from the test subject.

7. The system of claim 1, further comprising a system control that controls a rotation associated with the at least one detector and receives scan data relating to the test subject from the at least one detector.

8. The system of claim 7, wherein the test bed includes at least one calibration marker of radiation, the system control being operative to automatically calibrate the system according to information within the scan data relating to the at least one point source.

9. The system of claim 8, wherein the at least one calibration marker includes at least one point source of radiation.

10. The system of claim 8, wherein the at least one calibration marker includes at least one radio-opaque marker.

11. The system of claim 1, wherein the collimator assembly substantially encircles the test bed.

12. The system of claim 1, further comprising a linear translation stage operative to move the test bed between a position in which the subject is substantially shielded from the at least one detector by the collimator assembly and a position in which the subject is not substantially shielded by the collimator assembly.

13. The system of claim 1, wherein the collimator assembly comprises a plurality of associated pinholes that allow radiation to pass through the collimator assembly.

14. A microscanner assembly for imaging a small laboratory subject in conjunction with a scanner designed primarily for imaging a human patient, comprising:
    a test bed that supports the subject; and
    a collimator assembly;
    the microscanner assembly being proportioned as to be supported by a patient bed associated with the scanner.

15. The microscanner assembly of claim 14, comprising a rotation assembly that rotates the test bed independently of a rotation associated with the scanner.

16. The microscanner assembly of claim 14, comprising a rotation assembly that rotates the collimator assembly independently of a rotation associated with the scanner.

17. The microscanner assembly of claim 14, further comprising:
    at least one calibration marker associated with the test bed; and
    a system control that controls a rotation associated with the scanner and receives scan data relating to the test subject and the at least one calibration marker from the detector, the system control being operative to automatically calibrate the system according to information within the scan data relating to the at least one calibration marker.

18. The microscanner assembly of claim 14, wherein the at least one calibration marker comprises a first radionuclide that has radiation emission of different energy than that of a second radionuclide injected in the subject.

19. The microscanner assembly of claim 14, wherein the collimator assembly substantially encircles the test bed.

20. The microscanner assembly of claim 14, further comprising a linear translation stage operative to move the test bed between a position in which the subject is substantially shielded from the scanner by the collimator assembly and a position in which the subject is not substantially shielded by the collimator assembly.

21. A method for imaging a laboratory subject, comprising:
    positioning the laboratory subject on a test bed within a micro-scanner assembly, comprising the test bed and a collimator assembly mechanically coupled to the test bed, such that the laboratory subject is substantially encircled by the collimator assembly;
    positioning the micro-scanner assembly on a first surface of a patient bed of a imaging device configured for imaging human patients; and
    scanning the laboratory subject with the imaging device, such that one of the test bed and the collimator assembly are rotated during scanning.

* * * * *